Figure 1:
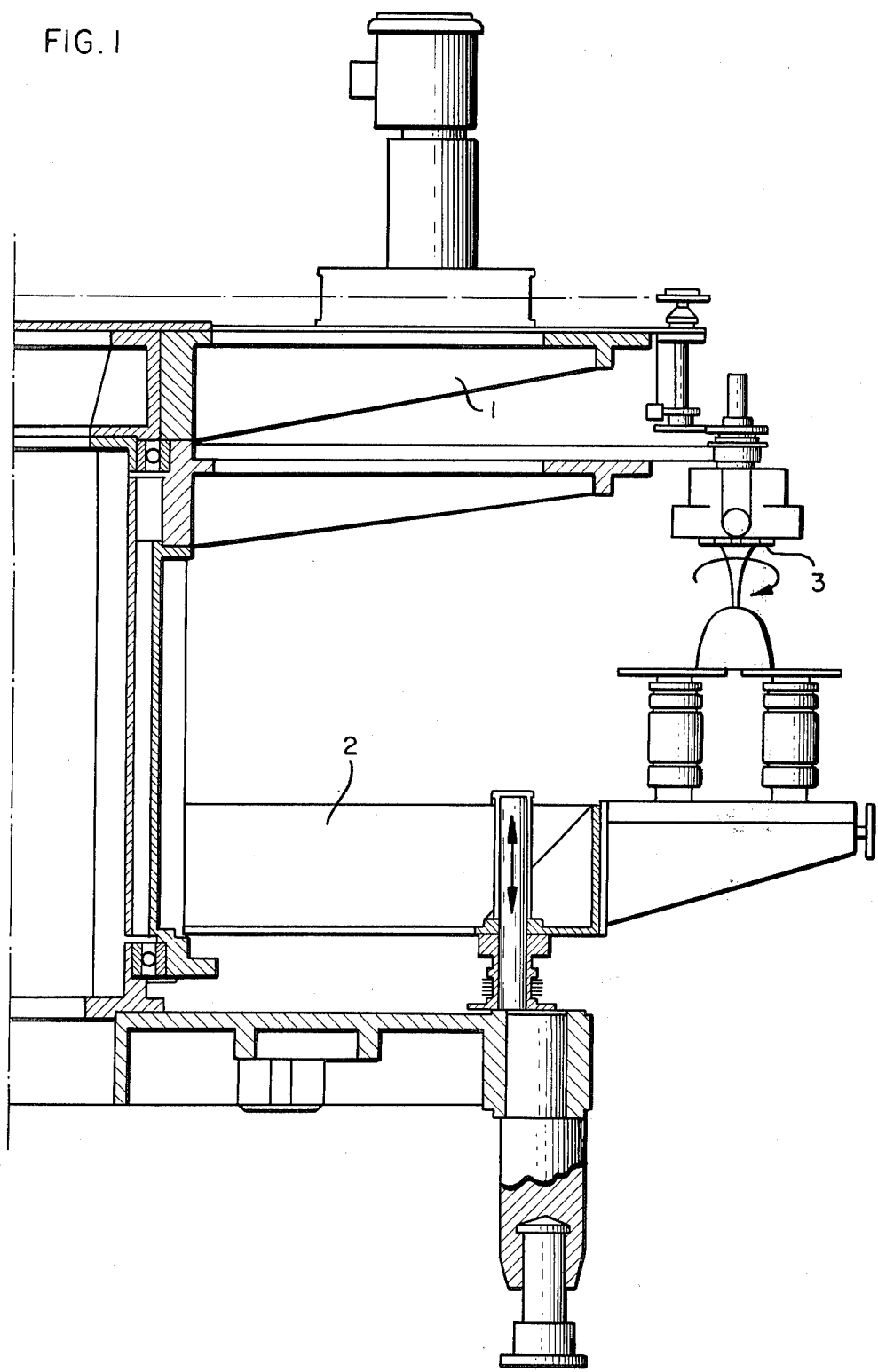

United States Patent [19]

Ilk

[11] 4,241,546
[45] Dec. 30, 1980

[54] HOLDING DEVICE FOR CUP-SHAPED GLASSWARE ARTICLES IN A GLASS PROCESSING MACHINE

[76] Inventor: Emil Ilk, Ahornweg 4, 8372 Zwiesel, Fed. Rep. of Germany

[21] Appl. No.: 30,132

[22] Filed: Apr. 16, 1979

[30] Foreign Application Priority Data

May 26, 1978 [DE] Fed. Rep. of Germany ....... 2823088
May 26, 1978 [DE] Fed. Rep. of Germany ... 7815846[U]

[51] Int. Cl.³ .............................................. B24B 9/12
[52] U.S. Cl. .................................. 51/227 R; 51/235; 269/21; 279/3
[58] Field of Search .................... 51/227, 235, 134; 269/21; 279/3

[56] References Cited

U.S. PATENT DOCUMENTS

| | | | |
|---|---|---|---|
| 176,525 | 4/1876 | Fry | 51/235 |
| 255,384 | 3/1882 | Fox | 51/227 |
| 469,052 | 2/1892 | Wood | 51/227 R |
| 1,122,114 | 12/1914 | Hill | 51/227 R |
| 1,607,292 | 11/1926 | Miller | 51/134 X |
| 1,744,313 | 1/1930 | Kadow | 279/3 |

*Primary Examiner*—Harold D. Whitehead
*Attorney, Agent, or Firm*—Fitch, Even, Tabin, Flannery & Welsh

[57] ABSTRACT

The invention relates to a holding device for cup-shaped glassware articles in a glass processing machine, especially in a bursting and grinding machine, wherein the cup is placed into the holding device prior to commencement of the processing operation. The cup is retained during processing of the articles in the holding device which comprises a cup-shaped holding element the cavity of which receives said cup. The base portion of the cup may be engaged by a rotating holder of said glass processing machine, and the marginal inner face of said holding element mounts means for retaining cup as it is transferred from station to station in the machine.

3 Claims, 2 Drawing Figures

HOLDING DEVICE FOR CUP-SHAPED GLASSWARE ARTICLES IN A GLASS PROCESSING MACHINE

The present invention relates to a holding device for cup-shaped glassware articles (cups or beakers) in a glass processing machine, especially a machine having bursting (separating) and grinding station. The cup is placed into the holding device prior to commencement of the processing operations and is retained thereby during processing of the articles and, optionally, during their advance in the machine, and wherein said cup is subsequently removed from said holding device.

Glass processing machines having bursting and grinding stations are known in which the fully automatically blown glassware is processed until finished, wherein, thus, the unnecessary glass portion resulting from the blowing operation is separated (burst off) whereupon the thus formed glass edge is ground and smoothed.

Normally, these automatic bursting and grinding machines are suitable for the processing of cup-shaped glasses only, with the stems of the glassware being supported in between the moving machine parts.

Therefore, it is disadvantageous that these existing automatic bursting and grinding machines do not allow to process also stem-less glassware, such as, for instance, beakers or tumblers.

Now, it is an object of the present invention to overcome this disadvantage by providing a holding device for glass processing machines which retains or clamps not only stemmed glassware, but also beakers or cup-shaped glassware so as to allow the glassware to be processed on the machine without any rearrangement or reconstruction of the holders.

Furthermore, the holding device according to the invention should be of simple construction, reliable and efficient in operation while permitting, in addition to securely retaining the glassware as is required for the processing thereof, easy removal of the glassware from the transporting position without any difficulty.

According to the present invention, this object is solved in a holding device, comprising a cup-shaped holding element having a cavity which receives the cup or beaker and the base portion of which is engaged by an optionally rotating holder of said glass processing machine, and wherein the marginal inner face of said holding element has sealing, adhering or clamping means for the cup.

Preferably and in detail, the construction of the holding device is such that the sealing means comprises a circumferential ring contacting the exterior surface of the cup and that vacuum ports, vacuum conduits and pumps establish a vacuum in the interior cavity of said holding element to grip the cup.

In order that stemmed glassware can be further processed without any conversion, or to allow the present holding units to be used without any modification of the automatic machine, preferably the holders of said glass processing machine are of a configuration capable of engaging and retaining the base of a goblet. In this construction, the mounting openings or receptacles are directed downwards so that the glassware articles may be mounted with their mouth opening in downward direction, as is customary, during the automatic processing operations.

In order to provide for ready removal of the finished cup-shaped glassware articles, preferably the vacuum system includes a vent valve operative to vent the interior of the holding element prior to or during removal, respectively, of the glassware articles.

In consideration of the simple holding unit which nevertheless is highly efficient in operation, it may be said that an ideal solution to the existing problems is provided by the invention, particularly in view of the fact that existing processing machines need not be rearranged or adapted to the device.

Figure 2:
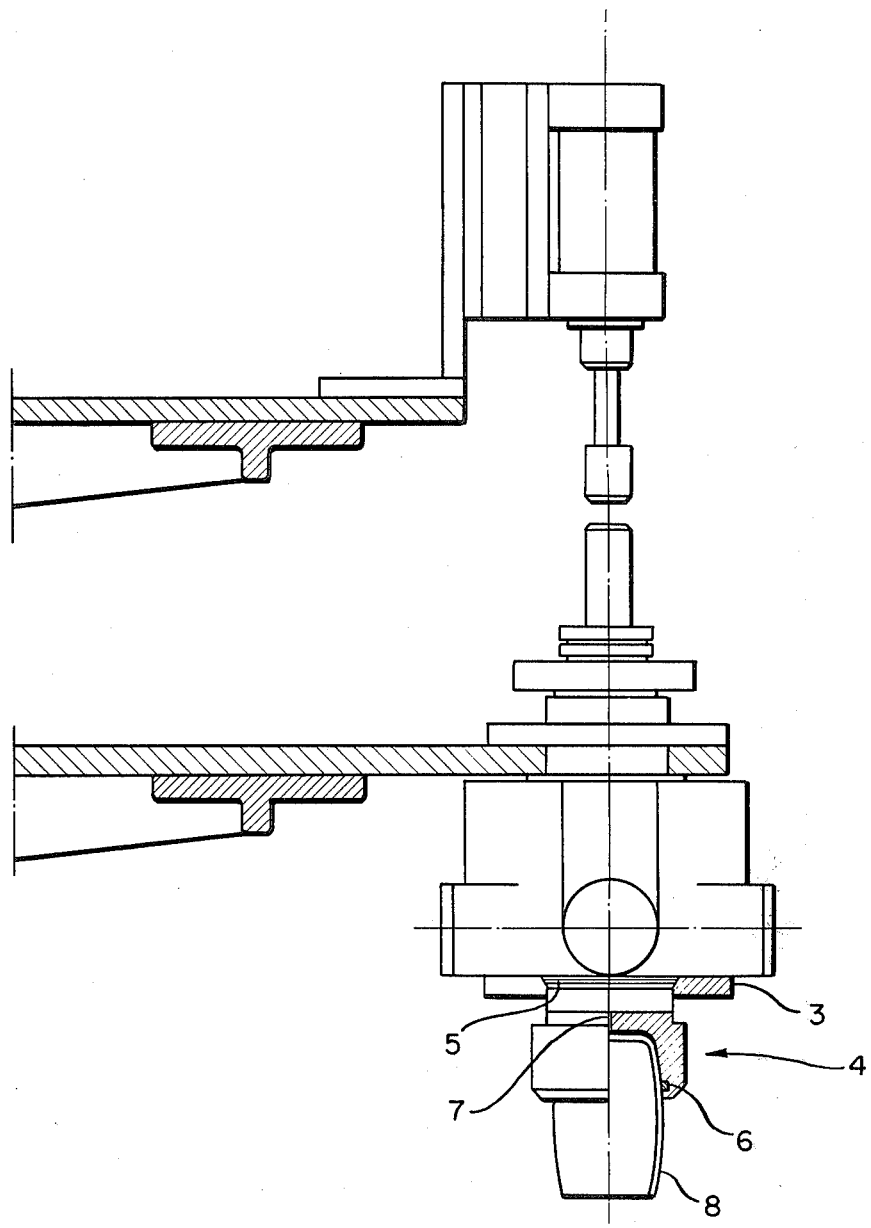

Below, an exemplary embodiment of the invention is explained in greater detail by referring to the accompanying drawings, wherein:

FIG. 1 is a part sectional view of a processing automaton for the processing (machining) of normal stemmed glassware articles (goblets); and FIG. 2 shows on enlarged scale a part view of the same automaton including the holding device according to the invention with a cup-shaped glass or beaker being held therein.

The auxiliary holding device according the the invention is suitable especially for use in bursting and grinding equipment as disclosed in U.S. Pat. No. 4,185,419. In order to avoid repetitions, explicit reference is made to the disclosure of this patent application. The automatic machine as such is described in this connection only as far as is necessary for the understanding of the present invention.

As shown in FIG. 1, a bursting and grinding automatic machine comprises an upper rotary table 1 for supporting the glassware articles and a lower non-rotating table 2 adapted to be raised and lowered and including the various processing stations, with only one grinding station among these stations being illustrated. The table 1 rotates in turret fashion to sequentially move the glasses through the respective processing stations.

In those positions of the table 1 where the glassware articles are mounted in rotating holders 3, a holding element 4 is clamped, as shown in FIG. 2, in the place of a goblet or stemmed glassware article, which holding element has the configuration of a downwardly opening cup. The foot or base portion 5 of holding element 4 is of such a shape that it is engaged by the holder 3 in the same manner as the base of a stemmed glass or goblet is engaged, such that it is no longer necessary to rearrange the automatic machine when using the holders according to the invention.

Holding element 4 includes in its inner marginal face, sealing means of O-rings 6, and the holding element 4 is connected through a central vacuum port 7 to a vacuum system (not illustrated) conduits, pumps and valves, which vacuum system is operative to produce, when the cup or beaker 8 is placed into the holder, a vacuum in the gap between the beaker 8 and the interior space of holding element 4, whereby the cup or beaker 8 is secured against rotation and securely retained in element 4.

A vent valve (not illustrated) provides for venting of the interior of the holding element 4 when the cup or beaker has been moved into its discharge position.

A plunger (not shown) passing concentrically through the vacuum port 7, is further active to provide for automatic application of the necessary vacuum. More specifically as soon as the cup or beaker 8 is placed into the holding element 4 from below, the bottom of the cup to actuates the plunger and establishes the vacuum to hold the cup.

As explained the holding device according to the invention may be used in particularly easy and operationally safe manner.

What we claim is:

1. In a glass processing machine, the combination comprising:
    a rotatable over head turret for carrying cups between a plurality of stations,
    a plurality of cup holding devices on said turret for holding cups in an inverted position with the rim of the cup mouth being lowermost,
    said cup holding devices comprising:
    a cup shaped holding element having a wall encircling the sidewall of the cup and having a bottom opening and upwardly extending cavity into which is projected the base and sidewall of the inverted cup,
    said cup shaped element having an upper wall for being positioned adjacent to the inverted bottom wall of the cup,
    an upper base portion on said holding element for securing to a rotating holder portion of the glass processing machine,
    and a circumferential sealing ring on the encircling wall of said holding element for contacting the exterior surface of the sidewall of the cup,
    said circumferential sealing ring having sealing engagement with the cup's sidewall to define a chamber thereabove and across the top of the inverted cup bottom wall to provide a vacuum chamber across the entire upper portion of the inverted cup,
    and means for establishing a vacuum in said chamber in the space between said inverted cup bottom wall and the cup side wall extending down to said sealing ring.

2. A glass processing machine in accordance with claim 1 in which a rotating holder means is provided on said turret for said holding devices to rotate them and the cups held thereby.

3. A glass processing machine in accordance with claim 2 in which said holding devices are detachably secured to said rotating holder means and a vacuum is applied to said holding devices to hold said cups, said rotating holder means holding the base of a stemmed glassware when said holding devices have been detached.

* * * * *